F. RICHARD.
REAR AXLE CONSTRUCTION.
APPLICATION FILED JAN. 15, 1917.
1,337,411.
Patented Apr. 20, 1920.
2 SHEETS—SHEET 1.
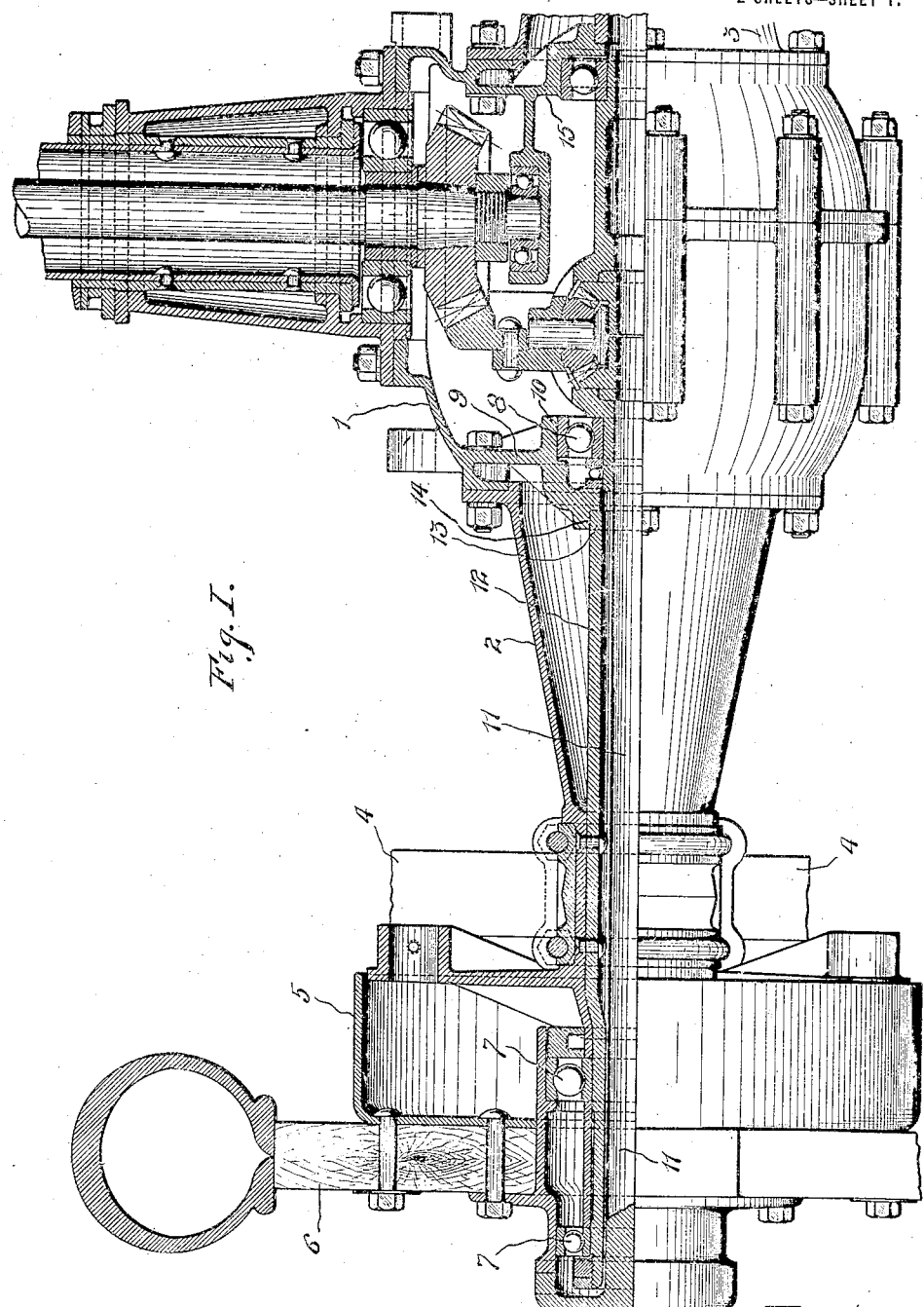
Fig. I.
Inventor:
François Richard
by his atty

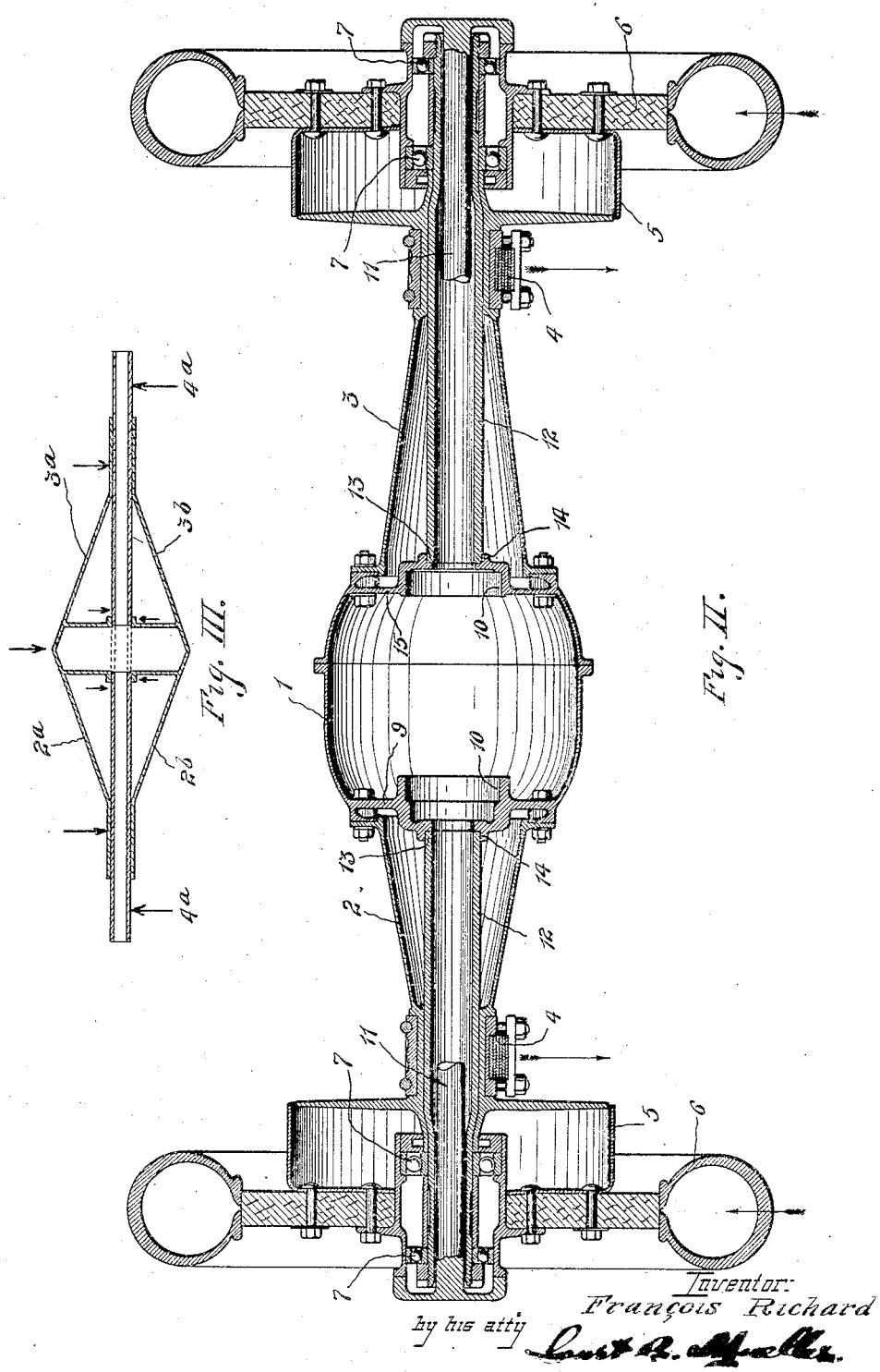

UNITED STATES PATENT OFFICE.

FRANÇOIS RICHARD, OF CLEVELAND, OHIO, ASSIGNOR TO THE RICHARD AUTO MFG. COMPANY, OF CLEVELAND, OHIO.

REAR-AXLE CONSTRUCTION.

1,337,411.  Specification of Letters Patent.  Patented Apr. 20, 1920.

Application filed January 15, 1917. Serial No. 142,479.

*To all whom it may concern:*

Be it known that I, FRANÇOIS RICHARD, a citizen of the French Republic, residing at city of Cleveland, in the county of Cuyahoga and State of Ohio, have invented a new and useful Improvement in Rear-Axle Construction, of which the following is a specification, the principle of the invention being herein explained and the best mode in which I have contemplated applying that principle, so as to distinguish it from other inventions.

This invention relates to a rear axle construction adapted to be employed in an automobile.

My object has been to so design, proportion and connect certain essential parts as to effect a stronger unit and more durable whole, to insure correct alinement at all times hence perfect the general balance and consequently improve the running qualities of the superstructure of the vehicle.

Heretofore, some rear axle constructions have been compelled to carry the load through the medium of break joints. Nearly all of the rear axle constructions till now used have had the near ends of the inclosing sleeves terminate nearer the wheels than the driving shaft or at all events did not approach each other as closely as possible, and were not separately supported at such near ends. Such a condition created a deformity at the middle of the axle which distorted the axle housing out of alinement causing the driving shaft to bind and frequently to break. The attendant friction and loss of power during the prevalence of such a condition is clear but whether evident or not, has never before been remedied. My invention in contradistinction comprehends the prolongation of such near ends and the firm and rigid support of each at its inner extremity. In consequence, the load is properly and uniformly sustained against both tension and compression with the result of insuring the maintenance of perfect alinement of all the parts at all times and under all eventualities.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

Adverting to the drawing:

Figure I is a sectioned partial assembly of the rear differential drive of an automobile equipped after the manner of this invention.

Fig. II is a section of a rear axle structure embodying the distinctive feature.

Fig. III is a diagrammatic view showing the location and character of stresses to be encountered.

It has been deemed advisable to illustrate, as appears on Sheet 1, enough of the differential driving mechanism commonly employed in automobiles to make clear the relation of my invention thereto and in what manner the professed advantages thereof may be achieved. It may be well to premise further by mentioning a prevailing condition with which all automobile manufacturers are familiar, namely, that the jolts, wrenches, tilts and vibrations to which the rear axle and its driving mechanism, and hence the supporting structure for both are regularly subjected, makes a very severe demand for a strong and rigid interconnection therebetween. More specifically, the strains encountered by the supporting structure for this type of divided rear axle are peculiar because of the excessive tendency to distort from proper position such parts as are spaced apart in an axial direction. With each repetition of such distortion the disorder is likely to become greater, so that eventually a disalinement and consequent deviation from perfect balance ensues. It is precisely this which my invention is purposed to resist and with measurable success, as is positively evidenced when the entire rear of the vehicle is jacked-up because the evenness of the bearings of both rear wheels has been so well maintained that each may be rotated by hand without rotating the other.

Obviously, the efficiency in the way of lessened loss of power and smoother transmission of power is augmented in corresponding degree.

Pursuant to the foregoing, the detailed description will be confined to only such mechanism and parts as are necessary to an understanding of my invention and the way in which it may be practised regardless of the form and character of the other connected and coacting parts which appear in Fig. I and some also in Fig. II.

A differential gear housing 1 carries, firmly attached to it on opposite sides, tapering continuations 2 and 3 respectively, which are then supported in any approved manner equal distances from the longitudinal middle of the automobile upon springs 4. Operatively connected with the housing laterally beyond each of the springs 4 is a brake drum 5 and a pneumatically tired wheel 6. Inasmuch as nothing new is claimed for the method of mounting of any of these parts no further description thereof is thought necessary. According to the exemplification of the drawings the axle is supported at each of its ends such that its outer end rests upon ball bearings 7 in both Figs. I and II; whereas its inner end is supported on ball bearings 8 seen only in Fig. I and which are carried interiorly of the differential gear housing in a manner to be later described.

Extending across opposite sides of the differential gear housing proper is an annular hollow bracket 9. This is fashioned in a direction toward the middle with an enlargement of its bore at 10, which enlargement is intended and adapted to support the ball bearing 8 for the inner end of the axle 11. The latter is spaced from the housing and all mechanism carried thereby by reason of the interpositioning in a manner, common to the art, of a sleeve 12. Heretofore, such a sleeve has surrounded the outer end of axles of this character, that is, at a point where the wheel is carried, and has then extended inwardly only as far or a little beyond the point of support upon the springs. It will be noticed that this sleeve 12 is according to my invention extended further toward the middle so that its inner extremity 13 may be firmly fitted in a socket 14 provided in the bracket 9 as may be clearly seen in Fig. II. In consequence of such an arrangement during the application of any given load, with its resultant strains, the latter become more uniformly distributed and the whole structure stiffened and held to a predetermined balance along its axial extent thereby achieving the advantages which I claim. The arrangement on the opposite side is identical with that just described with the exception of a slight difference in the shape of its supporting bracket 15, owing to the fact that the drive from the propeller shaft is not communicated adjacent to it.

The diagrammatic view depicted in Fig. III should aid in understanding the principle involved. From an inspection thereof it will be noticed that the remote extremities of the axles rests upon the pair of supports 4$^a$, whereas the load may be considered as applied above and in the middle, all as suggested by the three arrows. During the wrenching of the whole, while in use, what may be considered as the two upper compression members 2$^a$ and 3$^a$ and the two lower or tension members 2$^b$ and 3$^b$ will be measurably relieved in respect to the severity of duty which each has heretofore been required to perform, because of the added support furnished at the four arrows at the middle.

I claim:

1. A rear axle construction comprising a housing, driving means therein, a roller bearing at one end thereof, a bracket carried therein near said driving means and provided with a socket, another roller bearing carried by said bracket, an axle operatively connected with said driving means and mounted in said bearings, and a sleeve additionally supporting said first mentioned bearing and fitted in said socket whereby to stiffen said bearings in relation to the whole.

2. A rear axle construction comprising an axle, roller bearing units supporting opposite end portions thereof, and a sleeve supporting opposite sides of said units with reference to the axis of the whole, said sleeve extending along substantially the entire length of, and having its ends attached to said bearing units so as to be spaced from said axle.

3. A rear axle construction comprising a housing, driving means therein, a bracket adjacent said driving means, roller bearings carried by said housing and bracket, an axle operatively connected with said driving means and rotatable against said bearings, and a sleeve having one end interposed between said housing bearing and axle and having its other end secured to said bracket.

4. A rear axle construction comprising a housing adapted to be supported by wheels at each end, differential driving means within and near the middle thereof, axles connecting said wheels and driving means, a pair of brackets supported within said housing on opposite sides of said driving means, and a pair of sleeves each supported near its opposite ends upon said brackets and wheels respectively so as to surround and be spaced from said axles, the rigid support furnished for the inner ends of said sleeves being adapted to reinforce and more uniformly sustain the loads both of tension and compression.

Signed by me, this 5th day of January, 1917.

FRANÇOIS RICHARD.